United States Patent
Misch et al.

(10) Patent No.: US 9,342,672 B2
(45) Date of Patent: May 17, 2016

(54) COMPUTER-IMPLEMENTED METHOD FOR MANAGING AT LEAST ONE DATA ELEMENT IN CONTROL UNIT DEVELOPMENT

(71) Applicant: dSPACE digital signal processing and control engineering GmbH, Paderborn (DE)

(72) Inventors: Thomas Misch, Paderborn (DE); Mirco Hoecker, Lichtenau (DE); Dirk Stichling, Paderborn (DE)

(73) Assignee: dSPACE digital signal processing and control engineering GmbH, Paderborn (DE)

( * ) Notice: Subject to any disclaimer, the term of this patent is extended or adjusted under 35 U.S.C. 154(b) by 0 days.

(21) Appl. No.: 14/167,200

(22) Filed: Jan. 29, 2014

(65) Prior Publication Data

US 2015/0213241 A1    Jul. 30, 2015

(51) Int. Cl.
*G06F 21/62* (2013.01)
*G06F 21/31* (2013.01)
*G06F 21/45* (2013.01)
*G06Q 10/00* (2012.01)

(52) U.S. Cl.
CPC ............... *G06F 21/31* (2013.01); *G06F 21/45* (2013.01); *G06F 21/62* (2013.01); *G06Q 10/00* (2013.01)

(58) Field of Classification Search
None
See application file for complete search history.

(56) References Cited

U.S. PATENT DOCUMENTS

| | | | | |
|---|---|---|---|---|
| 6,341,291 B1* | 1/2002 | Bentley et al. | | |
| 6,591,278 B1* | 7/2003 | Ernst | | |
| 7,685,173 B2* | 3/2010 | Hageman | ............... | G06F 21/604 707/999.203 |
| 7,853,463 B2* | 12/2010 | Orifici | .................... | G06Q 10/00 705/7.12 |
| 8,407,078 B1* | 3/2013 | Caputo | .................. | G06Q 10/06 705/7.27 |
| 2004/0210755 A1* | 10/2004 | Becker et al. | ................. | 713/167 |
| 2006/0070124 A1 | 3/2006 | Arndt et al. | | |
| 2006/0107327 A1* | 5/2006 | Sprigg et al. | .................... | 726/26 |
| 2007/0033093 A1* | 2/2007 | Divine | .................... | G06Q 10/10 705/7.37 |

(Continued)

FOREIGN PATENT DOCUMENTS

| | | |
|---|---|---|
| CN | 101515308 A | 8/2009 |
| DE | 103 45 012 A1 | 4/2005 |
| DE | 10 2004 047 146 A1 | 3/2006 |

*Primary Examiner* — Hadi Armouche
*Assistant Examiner* — Malcolm Cribbs
(74) *Attorney, Agent, or Firm* — Muncy, Geissler, Olds & Lowe, P.C.

(57) ABSTRACT

A computer-implemented method for managing at least one data element in control unit development, the method allows uniform management of data elements over the entire development process by providing a management unit having a user interface, associating the data element with the management unit, and associating an access configuration with the management unit. The access configuration defines the accessibility of the data element by a user via the user interface.

9 Claims, 7 Drawing Sheets

(56) References Cited

U.S. PATENT DOCUMENTS

| | | |
|---|---|---|
| 2007/0056026 A1* | 3/2007 | Britton et al. .................... 726/5 |
| 2008/0113329 A1* | 5/2008 | Cumberland et al. ........ 434/362 |
| 2008/0172625 A1* | 7/2008 | Montgomery ......... G06Q 10/06 715/764 |
| 2009/0165125 A1* | 6/2009 | Brown et al. .................... 726/21 |
| 2009/0265634 A1* | 10/2009 | Beringer et al. .............. 715/733 |
| 2010/0161558 A1* | 6/2010 | Goldberg et al. ............. 707/639 |
| 2010/0299170 A1* | 11/2010 | Savescu et al. .................... 705/8 |
| 2010/0306011 A1* | 12/2010 | Correll .................. G06Q 10/06 705/7.36 |
| 2011/0107299 A1* | 5/2011 | Dehaan ......................... 717/121 |
| 2011/0119102 A1* | 5/2011 | Horn et al. .................... 705/7.13 |
| 2011/0153555 A1* | 6/2011 | Falkenberg et al. .......... 707/608 |
| 2012/0317288 A1* | 12/2012 | Campana et al. ............. 709/225 |
| 2013/0185773 A1* | 7/2013 | Flanagan .......................... 726/4 |
| 2013/0198676 A1* | 8/2013 | Garrett .................. G06Q 10/06 715/772 |
| 2014/0123316 A1* | 5/2014 | Leggette et al. ................ 726/28 |

* cited by examiner

COMPUTER-IMPLEMENTED METHOD FOR MANAGING AT LEAST ONE DATA ELEMENT IN CONTROL UNIT DEVELOPMENT

BACKGROUND OF THE INVENTION

1. Field of the Invention

The invention relates to a computer-implemented method for managing at least one data element in control unit development.

2. Description of the Background Art

Methods for managing data elements are known from various technical development sectors, and are used primarily in technical products whose development goes through several stages, wherein multiple developers or development groups taking part in the development have different views of the product and the data elements associated with the product, depending on their area of responsibility.

Control units can be understood to mean robust microcomputers which are presently typically provided for industrial use and which usually have integrated I/O interfaces. Programs which in the broadest sense connect via the I/O interface to a technical process to be controlled and act on this process in a desired manner are frequently executed on control units which are equipped with a real-time operating system. Control units of the described type are used extensively in the automotive field, for example. In the meantime, the development of control units has become an important element in the development of mass-produced vehicles.

Control unit development may be classified into various areas in which different data elements of interest are typically processed. The beginning of the control unit development includes, for example, the area of requirement specifications and the area of test cases for testing the various requirements. These are followed by the area of test system descriptions, for example in the form of a hardware description of a hardware-in-the-loop test system, the area of mathematical models for simulating the control unit environment, or the area of parameter sets and signals for parameterizing the models; the listing is by way of example and may be freely expanded. It is readily apparent that in the various areas of control unit development, various contents in the form of the data elements are processed by different developers, and also should be processed only by them. In the prior art it is presently customary to perform the management of the data elements via control unit development in various development environments. For example, the requirement specifications are processed and managed in a different software environment than the software which is developed for various target control units.

It would be desirable to manage data elements using a uniform computer-implemented method via the overall process of the control unit development, so that different development environments do not have to be used for managing data elements. Accordingly, the object of the present invention is to provide a computer-implemented method of this type.

In the computer-implemented method described at the outset for managing at least one data element in control unit development, the object formulated and presented above is achieved by providing at least one management unit having a user interface, associating the data element with the management unit, and associating an access configuration with the management unit, the access configuration defining the accessibility of the data element by a user via the user interface.

The management unit is thus a program-based repository for the data elements associated with it, the user interface associated with the management unit ensuring the basic possibility for accessing the data elements contained in the management unit. In the access configuration, the type and/or the extent of the possibility for accessing the data element is/are defined by the user via the user interface. The configuration of the management unit according to the invention allows the accessibility of the contained data elements to be controlled by the users.

SUMMARY OF THE INVENTION

According to an embodiment of the method, it is provided that the accessibility of the data elements in the access configuration may be defined as "editable," "visible," or "not visible." If a data element is defined as editable, the user may access and also modify the data element via the user interface. For example, a management unit could contain the data elements "name," "description," and "unit," and, for example, the data elements "init-value," "min-value," "max-value," and "resolution." When the data element "resolution" is defined as editable, the value for the resolution may be influenced or specified differently by the user. However, if a data element is defined as "visible," the user may see the data element per se, but cannot influence or modify it. In contrast, if a data element is defined as "not visible," it is contained in the management unit, but the user cannot see it via the user interface, and of course also cannot process it.

In the simplest case, a data element may be a single data item, for example an alphanumeric character, a character string, or a number. A data element may also merely contain a reference to a certain content, and a data element may in particular refer to another data element of a different management unit, i.e., may reference this data element. The various data elements of a management unit may also be ordered and structured. Data elements may be, for example, the individual elements of data structures, so that the accessibility of each data element of the structure may be defined separately. However, a data element may also be an even more comprehensive data structure, in which case the accessibility associated with the data element is valid for all subdata elements contained in the data element.

In an embodiment of the method according to the invention, it is provided that at least one second management unit can be derived from an existing first management unit, the second management unit containing at least the data elements of the first management unit. In this case, the second management unit is in essence an offspring management unit of the first management unit, the first management unit and the second management unit matching with regard to at least the data elements of the first management unit. Even further data elements may be subsequently added to the second management unit, although this is not mandatory. A statement that the second management unit "contains" at least the data elements of the first management unit is thus also intended to mean the possibility that the second management unit contains a copy of the data elements of the first management unit, as well as the possibility that the data elements of the second management unit reference the corresponding data elements of the first management unit via an appropriate reference, for example via the program-based means of the pointers. The same applies for the method variant described below.

As an alternative to the above-mentioned embodiment of the method according to the invention, which is based on the derivation of management units, in another embodiment it is provided that a first management unit is referenced by at least one second management unit, the second management unit containing at least the data elements of the first management unit. Thus, for creating the second management unit it is not necessary for the second management unit to be an offspring management unit of the first management unit; rather, the second management unit may be, initially created independently from the first management unit, wherein for identifying the referencing with regard to content of the two management units, the second management unit subsequently makes reference to the first management unit, or vice versa; i.e., retroactive referencing is performed.

The two presented procedures of the management units which are derived from or which mutually reference one another have a particular usefulness due to the fact that the access configuration of the second derived or referenced management unit is established differently from the access configuration of the first management unit. This measure allows multiple data elements which are managed in a management unit to be provided with different access options in various stages of the control unit development. For example, if the data elements name, description, unit as well as init-value, min-value, max-value, and resolution, for example, are contained in a first management unit "standards", the access configuration for the management unit could be such that the data elements name, description, and unit are editable, whereas the more specific data elements init-value, min-value, max-value, and resolution are defined only as visible. As a result, it is possible for a "standards committee" established for setting company standards to provide declarative input into the management unit, but not be able to influence physical-technical declarations. From the first management unit "standards" it would be possible to derive only a second management unit "technical project management" containing the same data elements. Due to the option for providing different access configurations for the first management unit and the second management unit, the accessibility of the data elements name, description, and unit may be defined as visible in the management unit "technical project management," and the accessibility of the data elements init-value, min-value, max-value, and resolution may be defined as editable, so that the technical project management in the second management unit does not have the option to modify parameter names, for example, although the technical project management is obligated to provide physical-technical input for the appropriate data elements, which is ensured by the access configuration of the user interface.

More extensive influencing of the accessibility of data elements is achieved in one refinement of the above-described method for managing data elements, in that within the scope of the access configuration, the user interface permits processing of the data elements only for users who are authorized users with respect to the user interface. Thus, not only may the restriction be imposed that only certain data elements are editable and/or visible within a given management unit, but it may also be specified that data elements which are editable in principle may be processed or viewed only by an authorized user group, and not by any arbitrary users. One preferred embodiment provides that the access configuration of the user interface includes multiple user-specific information items regarding the accessibility of the data elements by various users, so that various users, provided that they are able to identify themselves to the user interface as authorized users, are able to access the data elements within the scope of their user-specific access configuration. It is thus possible not only to grant full access to various users or to allow same within the same scope of rights, but also to establish different scopes of access for different users.

In a refinement of the method, another type of access restriction is achieved by additionally defining in the user interface at least one time window in which processing of the data elements is possible within the scope of the access configuration. As a result of this measure, a versioning may be achieved in a larger time scale by "freezing," in a manner of speaking, certain states of development and operations within a management unit.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
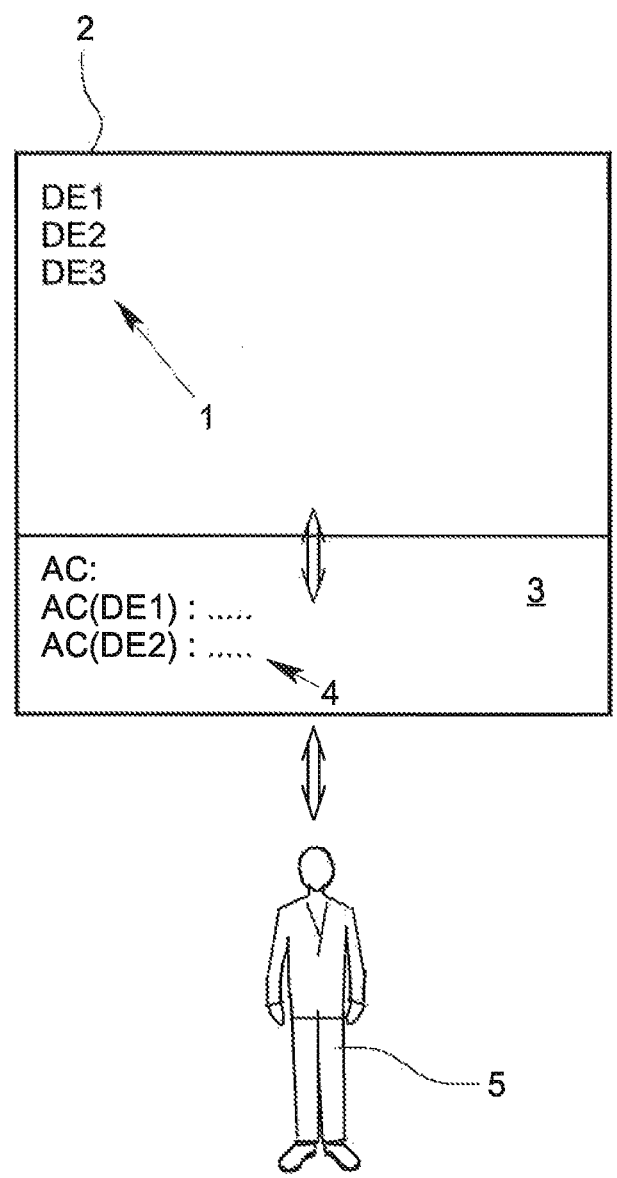
FIG. 1 shows a management unit for carrying out the management method.

FIGS. 1 through 7 show various aspects of a computer-implemented method for managing at least one data element 1, DE1, DE2 which may be advantageously applied in particular in complex control unit development. FIG. 1 illustrates a management unit 2 having an interface 3, the management unit 2 playing a central role in carrying out the computer-implemented management method.

The data elements 1, which are denoted in each case by reference character "DE" followed by a number in FIGS. 1, 3 through 5, and 7, are associated with the management unit 2. Also associated in each case with the management units 2 is an access configuration 4, the access configuration 4 defining the accessibility of the data elements 1 by a user 5 via the user interface 3. The access configurations 4, each of which relates to the accessibility of a data element 1, are denoted in each of the figures by AC(DEn); the access configuration 4 of the data element DE1 is accordingly AC(DE1).

Figure 2:
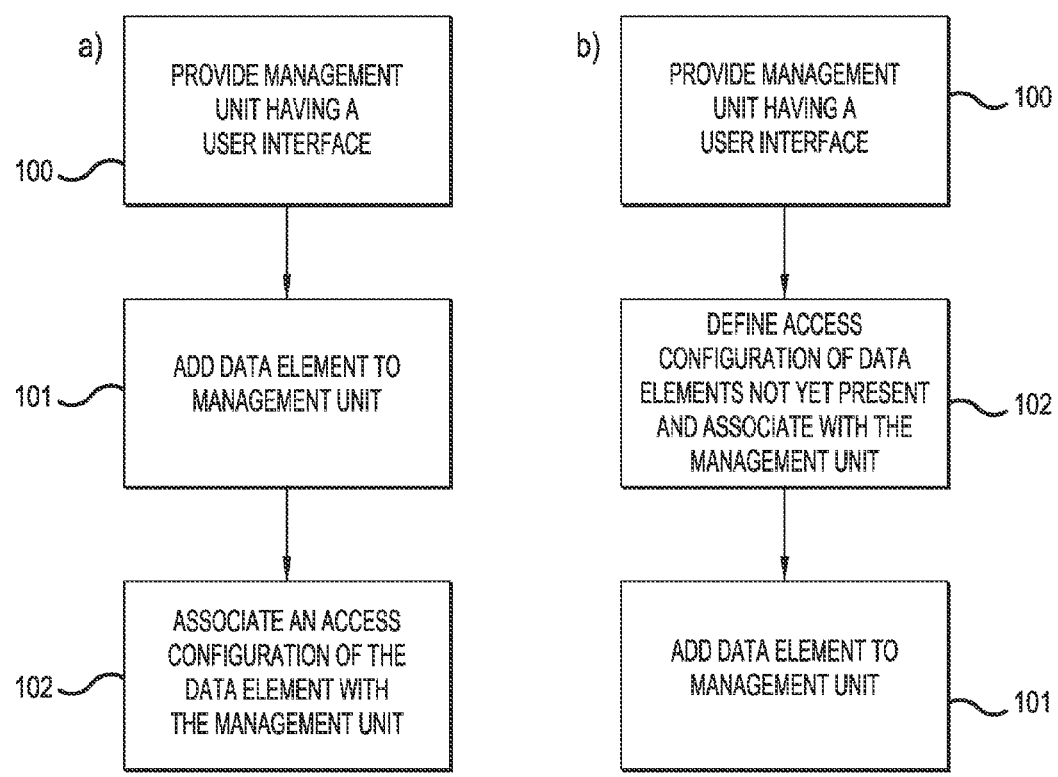
FIG. 2 shows various procedures for creating the management unit illustrated in FIG. 1.

FIG. 2 illustrates various options for creating a fully equipped management unit 2. In both variants illustrated according to FIG. 2a and FIG. 2b, initially a management unit having a user interface is provided in method step 100, the management unit representing the repository for a data element and an access configuration. In the method according to FIG. 2a, initially a data element is added to the previously provided management unit in step 101. An access configuration which defines the accessibility of the previously handled data element via the user interface is then associated with the management unit in the subsequent method step 102. It is apparent from the method variant according to FIG. 2b that an access configuration in which the accessibility of data elements which are not yet present is defined via the user interface may be associated with the initially provided management unit 2 in a subsequent method step 102. The data elements, whose accessibility has already been defined in the previously associated access configuration via the user interface, are subsequently associated with the management unit in step 101.

Figure 3:
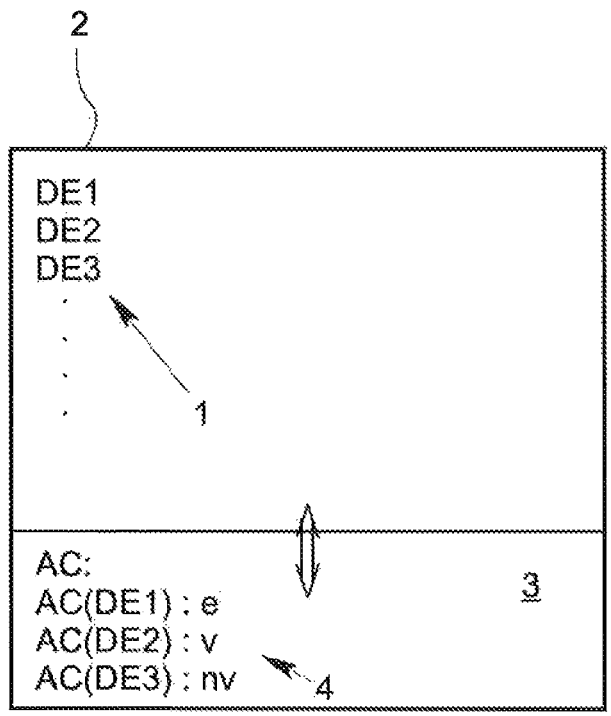
FIG. 3 shows a management unit having a specific design of the access configuration.

FIG. 3 illustrates the management unit 2, as known from FIG. 1, except that the accessibility of the data elements DE1, DE2, and DE3 in the access configuration 4 is now precisely specified. The accessibility AC(DE1) of the data element DE1 is characterized here as editable (e), the accessibility AC(DE2) of the data element DE2 is defined as visible (v), and the accessibility AC(DE3) of the data element DE3 is defined as not visible (nv). The inputs for the accessibility AC(DE) of a data element DE are valid for all users who would like to access the data elements 1 of the management unit 2 via the user interface 3.

Figure 4:
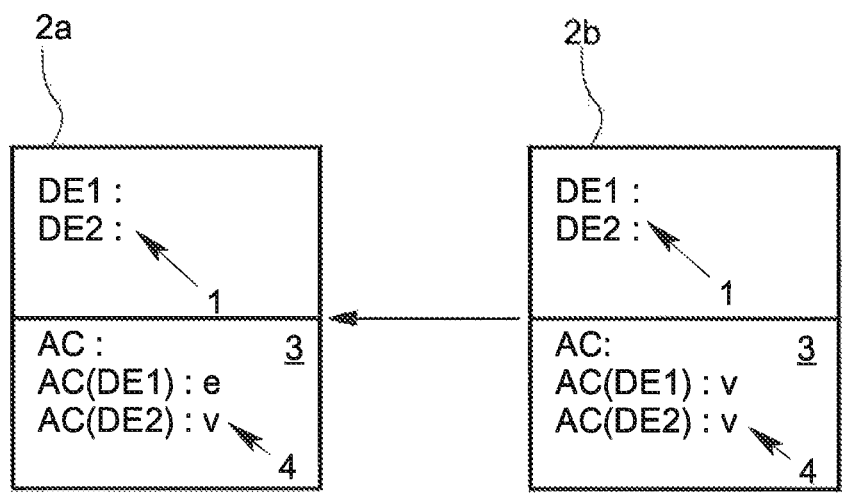
FIG. 4 shows the transfer of access configurations between management units which are derived from one another or which reference one another.
Figure 6:
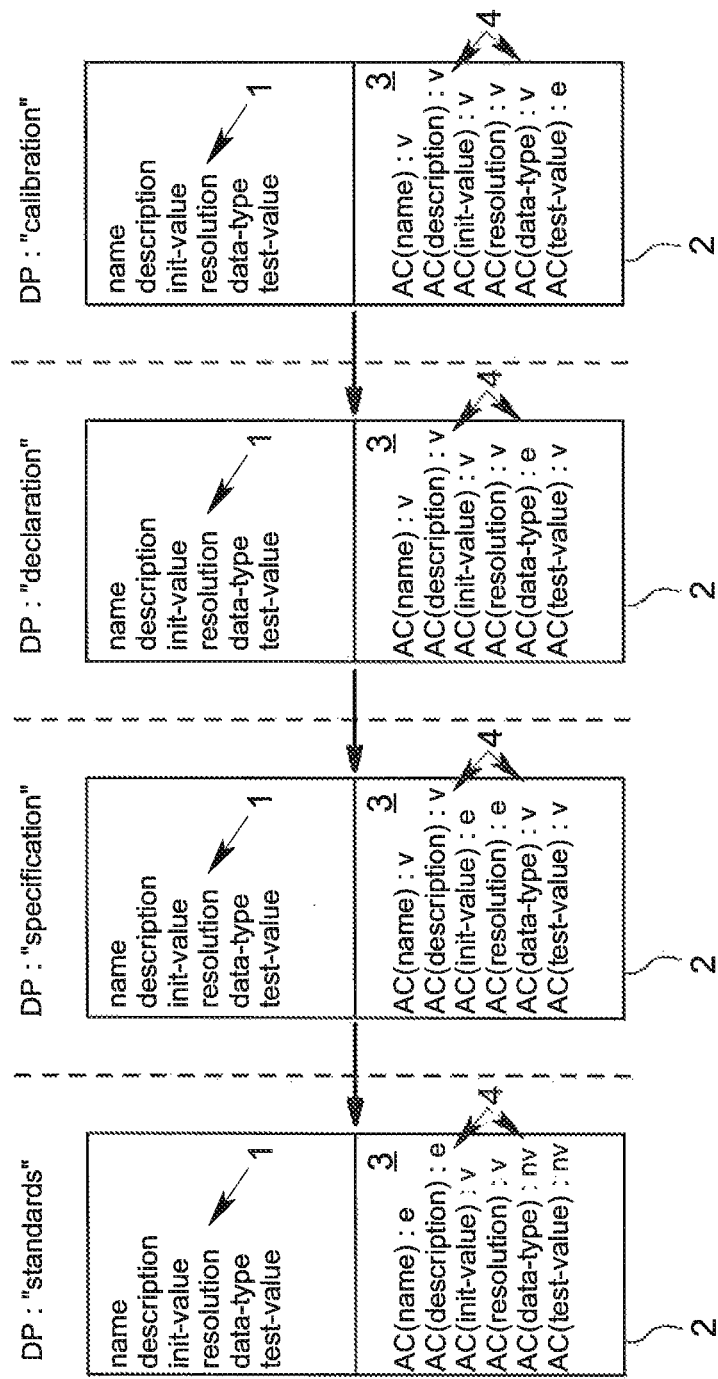
FIG. 6 shows management units in various development phases.

A number of further possible properties of the method for managing data elements 1 by means of management units 2 are clear with reference to FIG. 4. First of all, it is apparent that two management units 2a, 2b exist, a first management unit 2a being associated with a second management unit 2b, as indicated by the arrow between the two management units 2a, 2b. This reference between the management units 2a, 2b is achievable using various procedures. In one procedure, the reference may be established by deriving the second management unit 2b from the first management unit 2a, the second management unit 2b "inheriting," in a manner of speaking, the data elements 1 of the first management unit 2a. It is understood as a matter of course that these inherited data elements 1 also include a corresponding access configuration 4. The specific manner in which the access configuration 4 is defined is not initially important; in any event, the access configuration basically exists. The data elements DE1, DE2 of the second management unit 2b do not have to be identical copies of the data elements DE1, DE2 of the first management unit 2a. In the illustrated exemplary embodiment, the data elements DE1, DE2 of the second management unit 2b reference the data elements DE1, DE2 of the first management unit 2a, i.e., they reference the contents thereof. The illustration of separate referencing between the individual data elements 1 of the first management unit 2a and the second management unit 2b has been dispensed with for the sake of clarity. As a result of this procedure, chain references, for example, may be achieved by referencing even further management units with one another (as illustrated in FIG. 6).

Alternatively, the reference between the first management unit 2a and the second management unit 2b may be established by referencing the first management unit 2a by the second management unit 2b, whereby for avoiding conflicts, the second management unit 2b contains at least the data elements 1 of the first management unit 2a, as provided in the example according to FIG. 4.

A very particularly advantageous property of the management method is achieved in that the access configuration 4 of the second derived or referenced management unit 2b is established, or in any event may be established, differently from the access configuration 4 of the first management unit. FIG. 4 illustrates that the data element D1 in the second management unit 2b is defined as visible (AC(DE1):v), whereas the accessibility of the data element DE1 in the first management unit 2a has still been defined as editable (AC(DE1):e). Due to the variable definition of the access configuration 4 of management units 2 in referencing with one another, it is possible for the first time to define various areas in control unit development and to make data elements accessible in a suitable manner, and in particular in such a way that the data elements differ from one another.

In the exemplary embodiment according to FIG. 4, the access configuration 4 of the second management unit 2b has been automatically generated according to established rules for management units 2a, 2b in referencing with one another. Under a first rule it is specified that in the second management unit 2b the accessibility of such data elements which have been characterized as editable in the first management unit 2a is automatically established as visible. As a result of the automatic execution of this rule, the accessibility AC(DE1) of the first data element DE1 has been transformed from editable (e) to visible (v). According to a second transformation rule, it is provided that in the second management unit 2b the accessibility of such data elements 1 which likewise have been characterized as visible (v) in the first management unit 2a is automatically established as visible (v). As a result of the automatic execution of this rule, the accessibility AC(DE2) of the second data element DE2 has been left as visible (v).

Figure 5:
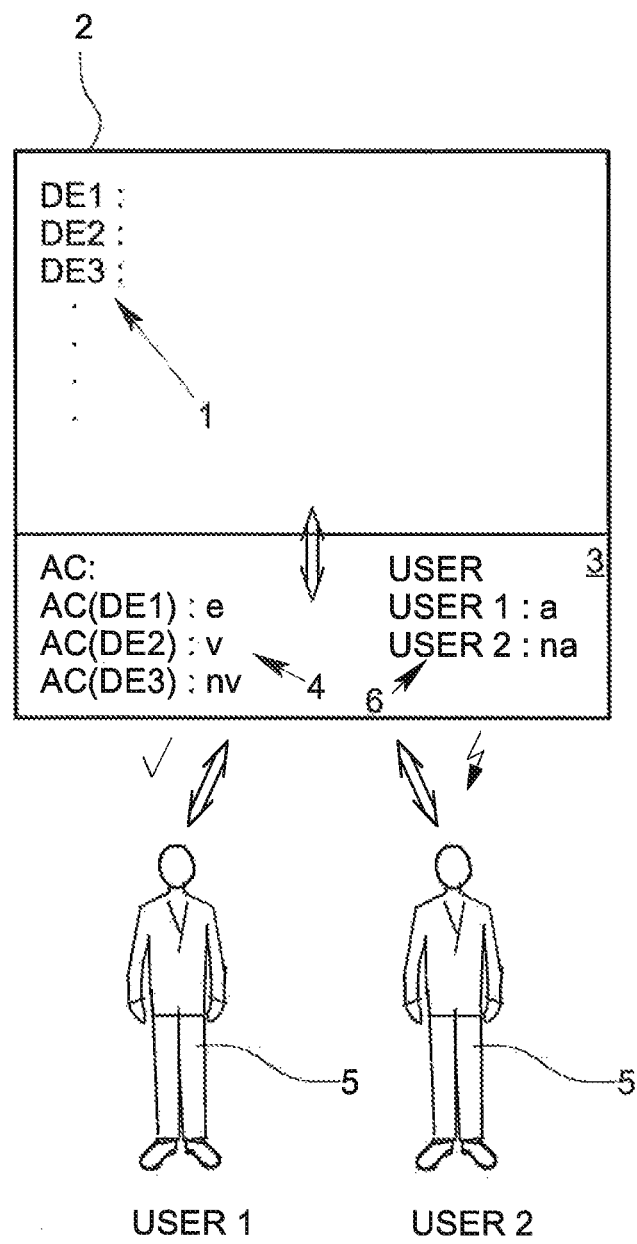
FIG. 5 shows a management unit having an additional user barrier.

FIG. 5 shows a management unit 2 whose user interface 3 is equipped with a user access restriction 6. The user access restriction 6 contains information concerning which users 5 are to be granted access to the data elements 1 via the user interface 3. In the illustrated exemplary embodiment, it is specified in the user interface 3 that the user USER1 has access (a) to the data elements 1, whereas the user USER2 has no access (na) to the data elements 1. By means of the user interface 3 configured in this way, it is possible within a management unit 2 to establish not only which contained data elements 1 are basically accessible, but also which users 5 may make use at all of the defined accessibility.

FIG. 6 illustrates various management units 2 which are derived from one another, the referencing of the management units 2 to another once again being represented by arrows. Different development phases DP are associated with the various management units 2, in the present case the four development phases "standards," "specification," "declaration," and "calibration" having been defined. The management units 2 illustrated in FIG. 6 are essentially based on a prototype of a parameter description. The parameter is described by various data elements 1, namely, the data elements "name," "description," "init-value," "resolution," "data-type" and "test-value."

The process of the control unit development proceeds from left to right; i.e., a pass is made in succession through the development phases "standards," "specification," "declaration," and "calibration." In the development phase "standards," the accessibility is defined as editable (e) only for the data elements "name" and "description," since the sole task of the responsible committee in this development phase is to ensure that the required parameters and signals are consistent with the naming conventions, for example, and are provided with a description which corresponds to guidelines. Processability of the data elements in the development phase "standards" is not provided, so that the accessibility of the remaining data elements has been defined either as visible (v) or as not visible (nv).

In the subsequent development phase "specification," the previously set values for the data elements "name" and "description" can no longer be changed, and their accessibility (AC(name) and AC(description)) is therefore set only to visible (v). However, the data elements "init-value" and "resolution" may be specified in the present development phase, for which reason the accessibility of these data elements has been defined as editable (e). Following the same principle, in the subsequent development phases "declaration" and "calibration" only the data element "data-type" and the data element "test-value" are still characterized as editable (e).

Figure 7:
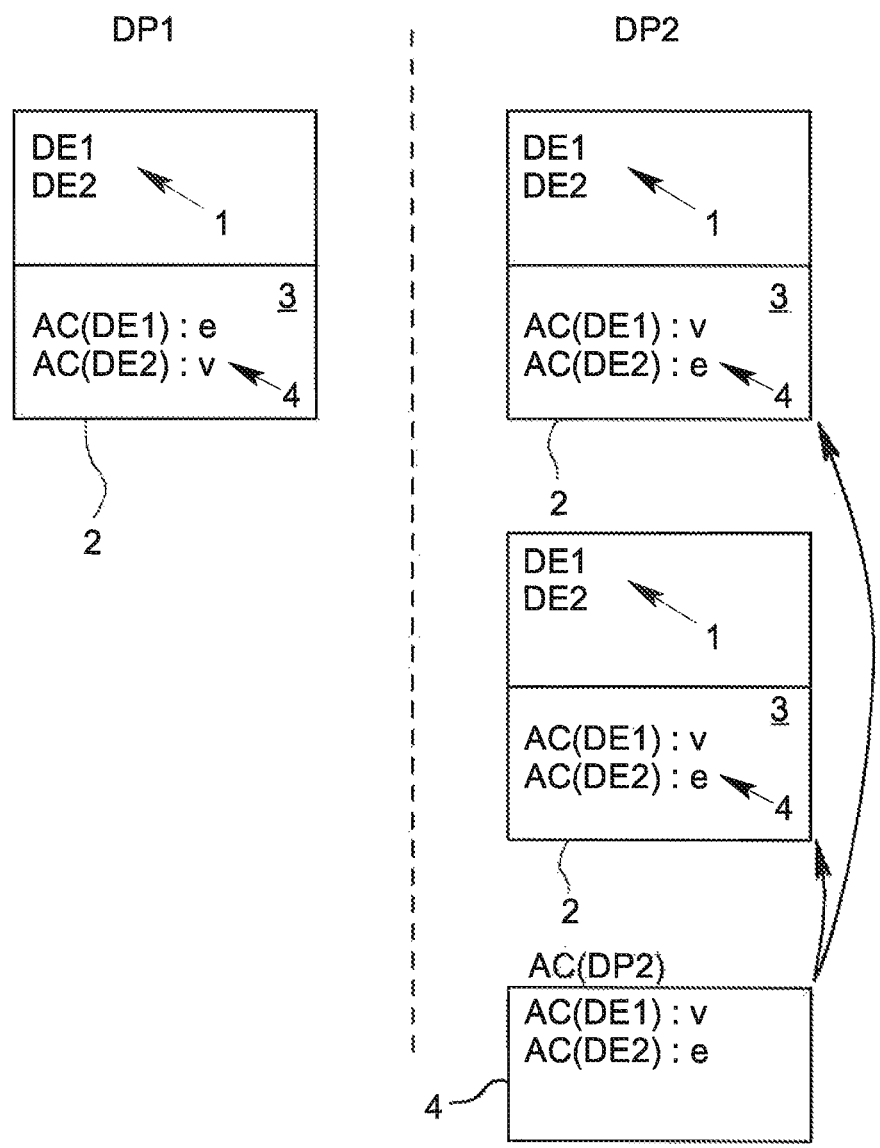
FIG. 7 shows the organization of access configurations for management units in the same development phase.

FIG. 7 illustrates a refinement of the method when dealing with development phases DP. Two management units 2 which contain the same data elements 1, DE1, DE2 are provided in the development phase DP2. In the illustrated exemplary embodiment, for the development phase DP2 a separate access configuration 4 (illustrated at the very bottom in FIG. 7) is defined which has been automatically associated with the management units 2 of the development phase DP2. Alternative association options are conceivable for implementing the process, for example by associating the access configuration 4 of already existing management units 2 of the same development phase DP with a further management unit 2, which is associated with a development phase DP, as soon as the further management unit 2 is added to the development phase DP.

The functionality that users and/or time windows are initially specified is in particular not illustrated but is nevertheless provided. As a result, the user-based access and the time window provided for basic processability are valid for all management units associated with the corresponding development phase. This is meaningful within the scope of uniform versioning for all management units of a development phase, and may also be meaningful for the management of user access restrictions when the same users in a development phase are responsible for all management units.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A computer-implemented method for managing at least one data element in a control unit development by different developers in a single development environment, the method comprising:
providing at least one first management unit of a first development phase of the control unit development, the at least one first management unit having a first user interface;
associating the at least one data element with the at least one first management unit;
associating an access configuration with the at least one first management unit, the access configuration defining an accessibility of the at least one data element by a user group associated with the first development phase via the user interface,
providing at least one second management unit of a second development phase of the control unit development that is either derived from the at least one first management unit or references the at least one first management unit, the at least one second management unit containing at least the at least one data element of the at least one first management unit and having a second user interface;
associating an access configuration with the at least one second management unit, the access configuration defining an accessibility of the at least one data element by a user group associated with the second development phase via the user interface; and
transmitting the first and second user interfaces to the respective user groups associated with the first and second development phases,
wherein the access configuration of the at least one second management unit is established differently from the access configuration of the at least one first management unit, and
wherein via the access configuration of the at least one first management unit and of the at least one second management unit, the respective user interfaces permit processing of the at least one data element only for user groups of the respective first and second development phases who are authorized users with respect to the user interfaces, such that user groups of the first and second development phases of the control unit development process the at least one data element in the single development environment.

2. The computer-implemented method according to claim 1, wherein the accessibility of the at least one data element in the access configuration of either the at least one first management unit or the at least one second management unit is defined as editable, visible, or not visible.

3. The computer-implemented method according to claim 1, wherein, in the second management unit, the accessibility of the data elements that have been defined as editable in the first management unit are automatically established as visible.

4. The computer-implemented method according to claim 1, wherein, in the second management unit, the accessibility of the data elements that have been defined as visible in the first management unit are automatically established as visible.

5. The computer-implemented method according to claim 1, wherein the access configuration of the user interface of the at least one first management unit and of the at least one second management unit includes multiple user-specific information items regarding the accessibility of the data elements by various users, so that various users, provided that they are able to identify themselves to the user interface as authorized users, are able to access the data elements within their user-specific access configuration.

6. The computer-implemented method according to claim 1, wherein, in the user interface of the at least one first management unit and of the at least one second management unit, at least one time window is additionally defined in which processing of the data elements is possible via the access configuration.

7. The computer-implemented method according to claim 1, wherein multiple development phases are defined, and wherein respective management units are associated with the defined development phases.

8. The computer-implemented method according to claim 7, wherein the management units that include same data elements as each other and are associated with a same development phase are automatically associated with a same access configuration.

9. The computer-implemented method according to claim 7, wherein, for at least one development phase, authorized users and/or time windows are specified, the specified authorized users and/or time windows for the user interfaces being valid for all management units which are associated with the particular development phase.

* * * * *